United States Patent
Ueta et al.

(10) Patent No.: US 11,708,288 B2
(45) Date of Patent: Jul. 25, 2023

(54) STIRRER AND METHOD FOR MANUFACTURING GLASS PLATE

(71) Applicant: Nippon Electric Glass Co., Ltd., Shiga (JP)

(72) Inventors: Eisaku Ueta, Shiga (JP); Yasuhiro Nishimura, Shiga (JP); Shusaku Tamamura, Shiga (JP)

(73) Assignee: NIPPON ELECTRIC GLASS CO., LTD., Shiga (JP)

( * ) Notice: Subject to any disclaimer, the term of this patent is extended or adjusted under 35 U.S.C. 154(b) by 516 days.

(21) Appl. No.: 16/348,547

(22) PCT Filed: Aug. 30, 2017

(86) PCT No.: PCT/JP2017/031148
§ 371 (c)(1),
(2) Date: May 9, 2019

(87) PCT Pub. No.: WO2018/116530
PCT Pub. Date: Jun. 28, 2018

(65) Prior Publication Data
US 2019/0292084 A1  Sep. 26, 2019

(30) Foreign Application Priority Data

Dec. 22, 2016  (JP) .................................. 2016-249760
Dec. 22, 2016  (JP) .................................. 2016-249762

(51) Int. Cl.
C03B 5/187 (2006.01)
B01F 27/191 (2022.01)
B01F 27/1125 (2022.01)

(52) U.S. Cl.
CPC ........ *C03B 5/187* (2013.01); *B01F 27/11251* (2022.01); *B01F 27/191* (2022.01)

(58) Field of Classification Search
CPC ...... C03B 5/187; B01F 7/003; B01F 7/00633; B01F 7/32; B01F 7/00908; B01F 27/11251; B01F 27/191; B01F 27/50; B01F 27/96
(Continued)

(56) References Cited

U.S. PATENT DOCUMENTS

| 76,484 | A | * | 4/1868 | Marr | ....................... | B01F 7/003 366/325.93 |
| 991,487 | A | * | 5/1911 | Deats | ....................... | A23G 9/12 366/149 |

(Continued)

FOREIGN PATENT DOCUMENTS

| CN | 101022884 | 8/2007 |
| CN | 104526877 | 4/2015 |

(Continued)

OTHER PUBLICATIONS

International Search Report dated Nov. 28, 2017 in International (PCT) Application No. PCT/JP2017/031148.
(Continued)

*Primary Examiner* — Charles Cooley
(74) *Attorney, Agent, or Firm* — Wenderoth, Lind & Ponack, L.L.P.

(57) ABSTRACT

A stirrer includes a shaft, and a plurality of stirring blades mounted on the shaft along a longitudinal direction of the shaft. The stirrer is configured to stir molten glass in a stirring vessel by causing the plurality of stirring blades to turn about the shaft in association with rotation of the shaft. The plurality of stirring blades (blade bodies) each have a through opening and a distal end portion extending along the longitudinal direction of the shaft. The plurality of stirring blades are mounted on the shaft so that, when the plurality of stirring blades turn about the shaft, the stirring blades that are closer to one end side of the shaft are delayed in phase (Continued)

around the shaft with respect to the stirring blades on another end side of the shaft.

20 Claims, 13 Drawing Sheets

(58) Field of Classification Search
USPC ............... 366/325.3, 325.9, 325.91, 325.93, 366/328.2–328.4
See application file for complete search history.

(56) References Cited

U.S. PATENT DOCUMENTS

| | | | | |
|---|---|---|---|---|
| 1,328,799 | A * | 1/1920 | Peiler | C03B 7/086 416/96 R |
| 1,510,653 | A * | 10/1924 | Carr | B01F 15/0266 222/233 |
| 1,631,061 | A * | 5/1927 | Rankin | C03B 7/088 65/331 |
| 1,678,291 | A * | 7/1928 | Howard | C03B 7/086 65/180 |
| 1,828,442 | A * | 10/1931 | Rankin | C03B 7/092 65/325 |
| 2,055,676 | A * | 9/1936 | Stewart | C03B 7/082 65/131 |
| 2,093,374 | A * | 9/1937 | Wadsworth | C03B 7/082 65/131 |
| 2,515,478 | A * | 7/1950 | Tooley | C03B 5/1875 65/180 |
| 2,569,459 | A * | 10/1951 | De Voe | C03B 5/1875 65/135.4 |
| 2,570,078 | A * | 10/1951 | Spremulli | C03B 7/092 65/180 |
| 2,716,023 | A * | 8/1955 | Cleveland | C03B 5/1875 65/180 |
| 2,750,161 | A * | 6/1956 | Simmons | C03B 5/1875 65/135.3 |
| 2,762,167 | A * | 9/1956 | De Voe | C03B 5/1875 65/135.4 |
| 2,831,664 | A * | 4/1958 | Spremulli | C03B 5/1875 366/329.1 |
| 2,871,000 | A * | 1/1959 | Dowling | C03B 5/1875 366/289 |
| 2,891,777 | A * | 6/1959 | Gregorius | B01F 7/183 366/290 |
| 3,233,993 | A * | 2/1966 | Weidel | C03B 5/06 65/374.11 |
| 3,236,618 | A * | 2/1966 | Allman | C03B 5/1875 65/178 |
| 3,352,659 | A * | 11/1967 | Rahe | C03B 5/1875 65/178 |
| 3,359,090 | A * | 12/1967 | Hynd | C03B 5/1875 65/178 |
| 3,367,761 | A * | 2/1968 | Zitkus | C03B 5/193 65/178 |
| 3,420,649 | A * | 1/1969 | Lewis, Jr. | C03B 17/04 65/66 |
| 3,725,025 | A * | 4/1973 | Giminez | C03B 5/1875 65/135.3 |
| 4,278,460 | A * | 7/1981 | Chrisman | C03B 5/1875 366/266 |
| 4,776,703 | A * | 10/1988 | Oda | B01F 7/00641 366/97 |
| 4,883,361 | A * | 11/1989 | Valentino | A21C 1/06 366/97 |
| 5,573,564 | A * | 11/1996 | Richards | C03B 5/1875 65/29.13 |
| 5,591,886 | A * | 1/1997 | Ichiki | B01D 9/0009 23/295 R |
| 5,683,178 | A * | 11/1997 | Nakamoto | B01F 15/00201 366/325.3 |
| 5,758,962 | A * | 6/1998 | Ismar | A21C 1/06 366/300 |
| 7,735,340 | B2 * | 6/2010 | Burdette | C03B 5/16 65/135.2 |
| 8,087,262 | B2 * | 1/2012 | Lineman | C03B 5/187 65/134.1 |
| 8,114,188 | B1 * | 2/2012 | Goller | C22B 9/14 75/633 |
| 2002/0023464 | A1 * | 2/2002 | Pitbladdo | C03B 7/092 65/135.4 |
| 2002/0178753 | A1 * | 12/2002 | Dick | C03B 7/084 65/86 |
| 2003/0101750 | A1 * | 6/2003 | Goller | B01F 7/00466 65/135.3 |
| 2004/0067369 | A1 * | 4/2004 | Ott | C03B 40/00 428/432 |
| 2008/0011016 | A1 * | 1/2008 | Bergman | C03B 5/187 65/29.12 |
| 2008/0101156 | A1 | 5/2008 | Yatomi et al. | |
| 2008/0151687 | A1 * | 6/2008 | Adelsberg | C03B 5/1675 366/279 |
| 2008/0282738 | A1 | 11/2008 | Yoshida | |
| 2009/0165500 | A1 * | 7/2009 | Luebbers | C03B 5/43 65/32.5 |
| 2011/0032791 | A1 * | 2/2011 | Singer | B01F 7/00125 366/307 |
| 2011/0205836 | A1 * | 8/2011 | Lentes | B01F 7/00133 366/325.92 |
| 2012/0042693 | A1 * | 2/2012 | Kim | C03B 5/435 65/29.19 |
| 2012/0073326 | A1 * | 3/2012 | Dorfeld | C03B 5/16 65/27 |
| 2012/0180529 | A1 * | 7/2012 | Singer | B01F 27/1123 366/302 |
| 2013/0003492 | A1 | 1/2013 | Adelsberg et al. | |
| 2016/0347638 | A1 | 12/2016 | Shinohara et al. | |
| 2018/0334404 | A1 * | 11/2018 | Schollmayer | B01F 7/0095 |

FOREIGN PATENT DOCUMENTS

| | | | |
|---|---|---|---|
| CN | 104827571 | | 8/2015 |
| FR | 1247722 | * | 12/1960 |
| JP | 2004099339 A | * | 4/2004 ............ C03B 5/187 |
| JP | 2004307302 A | * | 11/2004 ............ C03B 5/187 |
| JP | 2008-120630 | | 5/2008 |
| JP | 2010-513211 | | 4/2010 |
| JP | 2011-178656 | | 9/2011 |
| JP | 2016-508477 | | 3/2016 |
| JP | 3206061 | | 9/2016 |
| JP | 2018104211 A | * | 7/2018 |
| JP | 2018104212 A | * | 7/2018 |
| JP | 2019218252 A | * | 12/2019 |
| JP | 2021-169383 A | * | 10/2021 |
| KR | 20130141296 A | * | 12/2013 |
| WO | WO-2012060372 A1 | * | 5/2012 ......... B01F 7/00141 |
| WO | 2014/116549 | | 7/2014 |
| WO | WO-2014116549 A1 | * | 7/2014 ............ C03B 5/182 |
| WO | 2015/128924 | | 9/2015 |
| WO | 2016/135084 A1 | * | 9/2016 |
| WO | WO-2018116530 A1 | * | 6/2018 ......... B01F 7/00633 |
| WO | WO-2019082470 A1 | * | 5/2019 ............ C03B 5/187 |

OTHER PUBLICATIONS

International Preliminary Report on Patentability and Written Opinion of the International Searching Authority dated Jun. 25, 2019 in International (PCT) Application No. PCT/JP2017/031148.
Office Action dated May 17, 2021 in corresponding Chinese Patent Application No. 201780062429.5, with English Translation of Search Report.

* cited by examiner

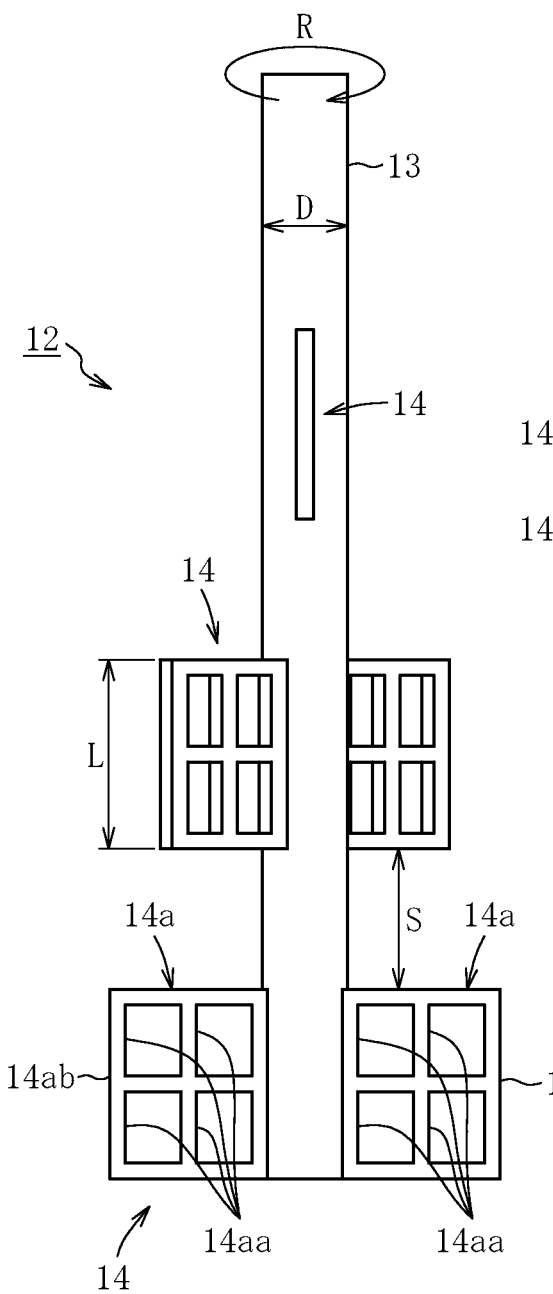
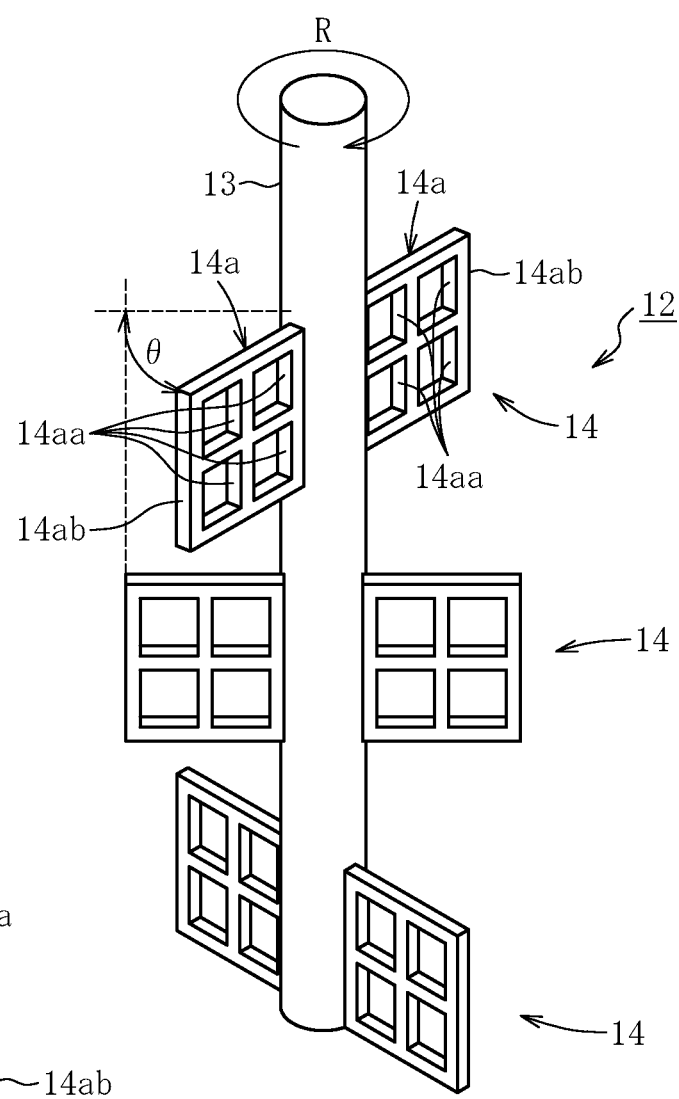
FIG. 4a
FIG. 4b

FIG. 5a
FIG. 5b
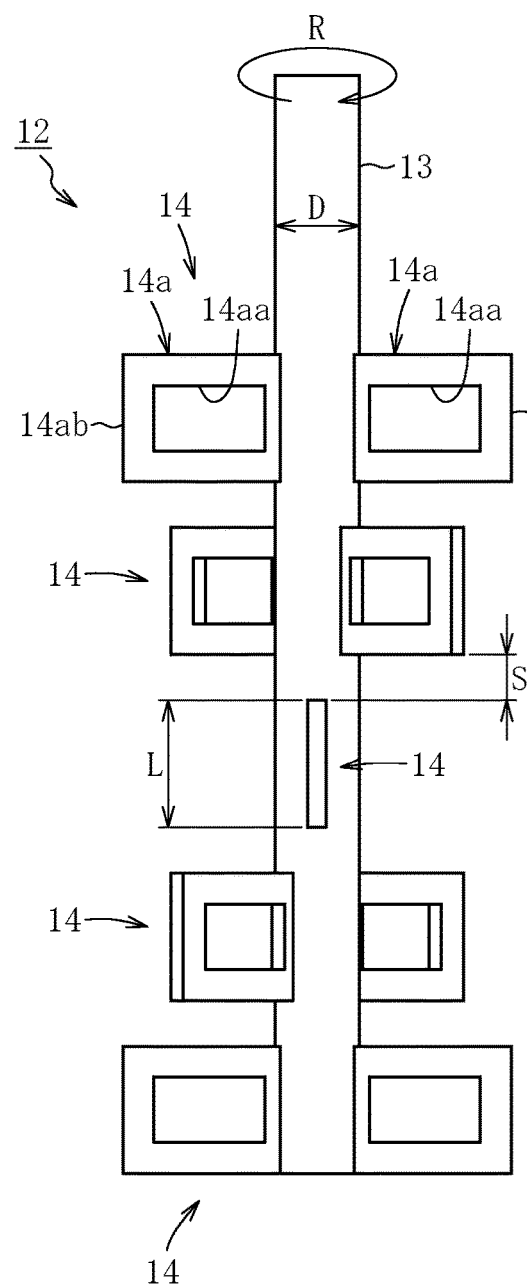
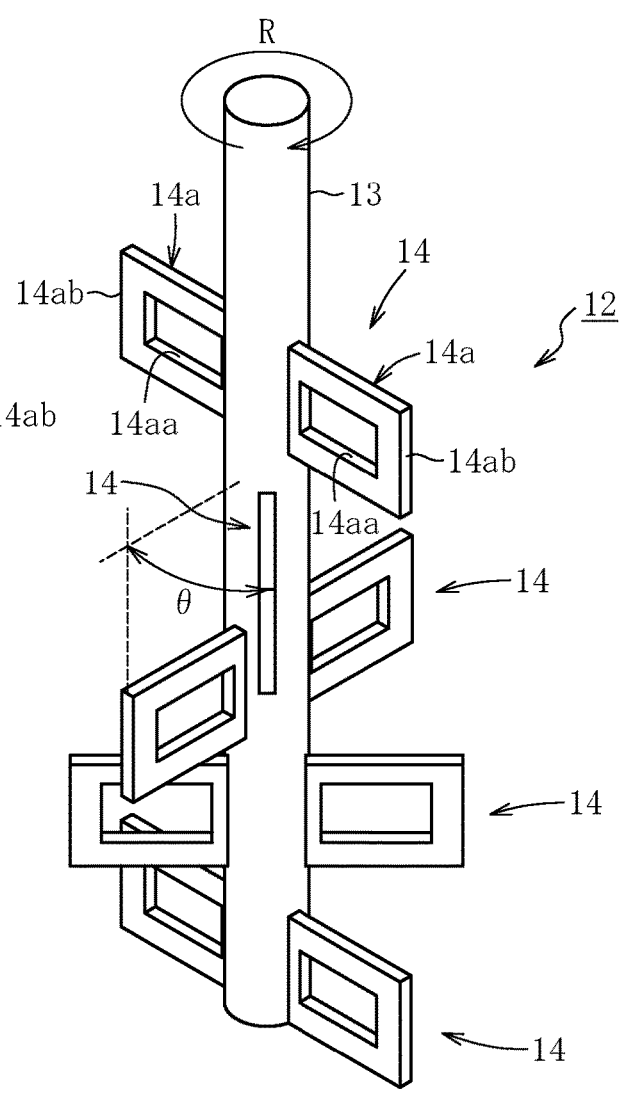

FIG. 6a
FIG. 6b
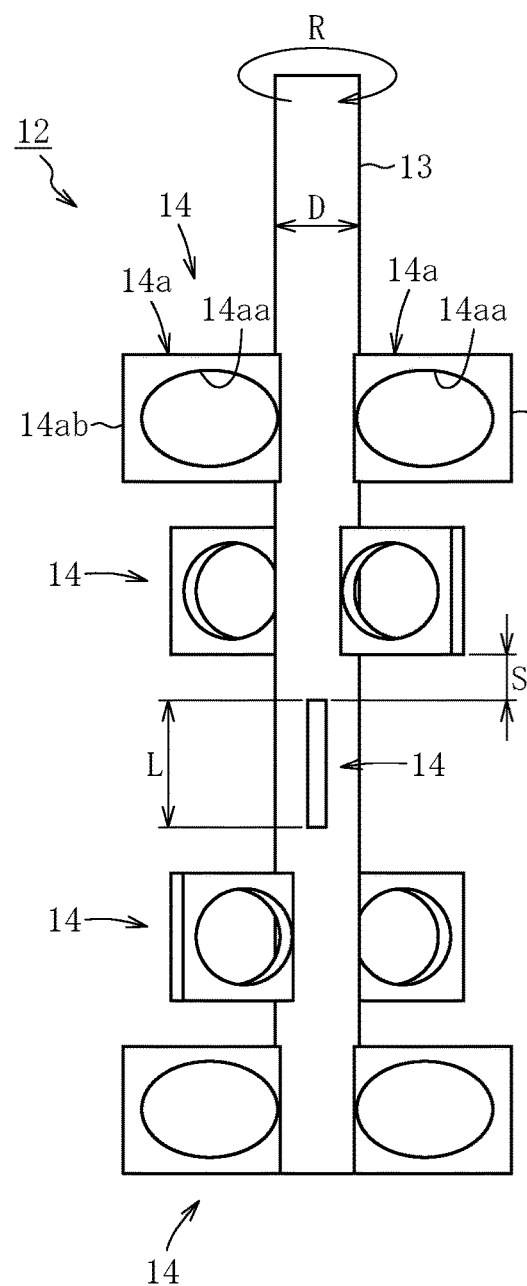
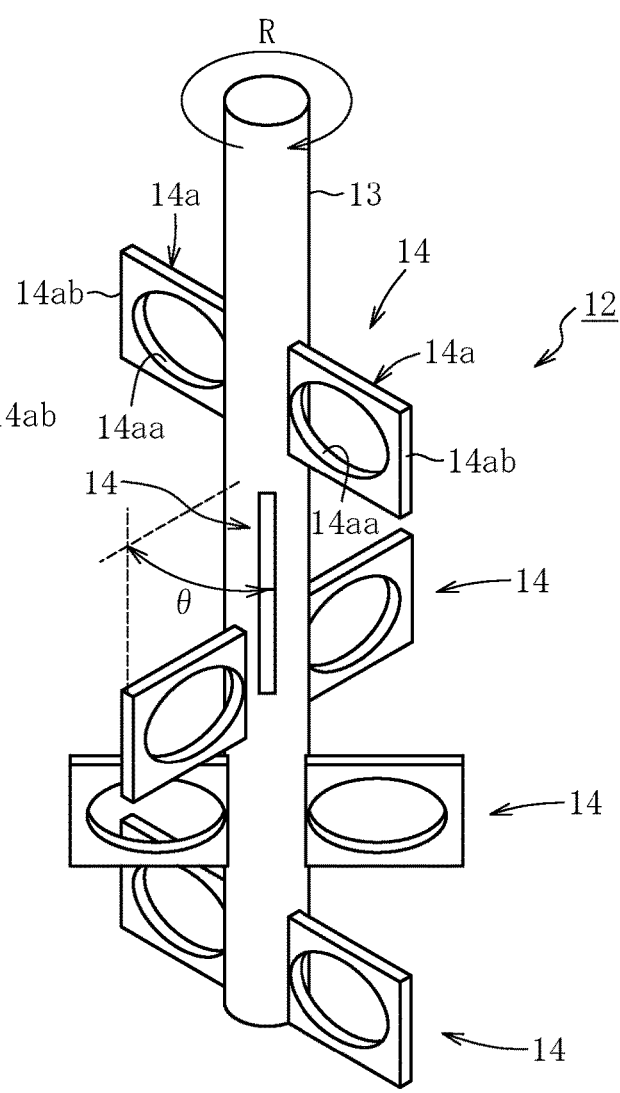

FIG. 9a
FIG. 9b
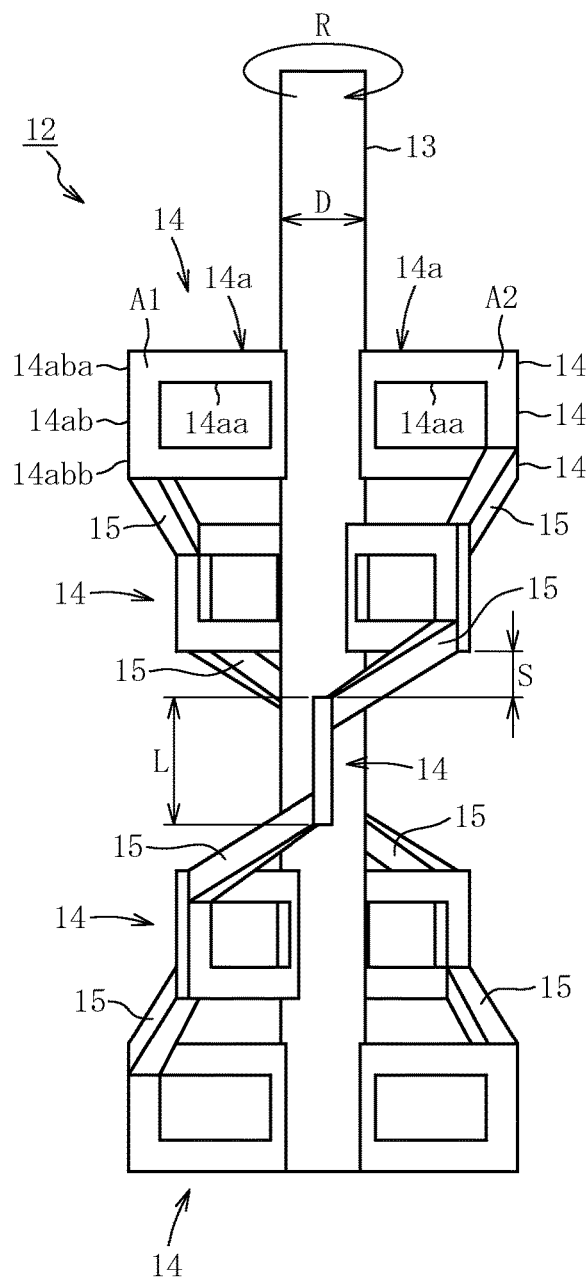
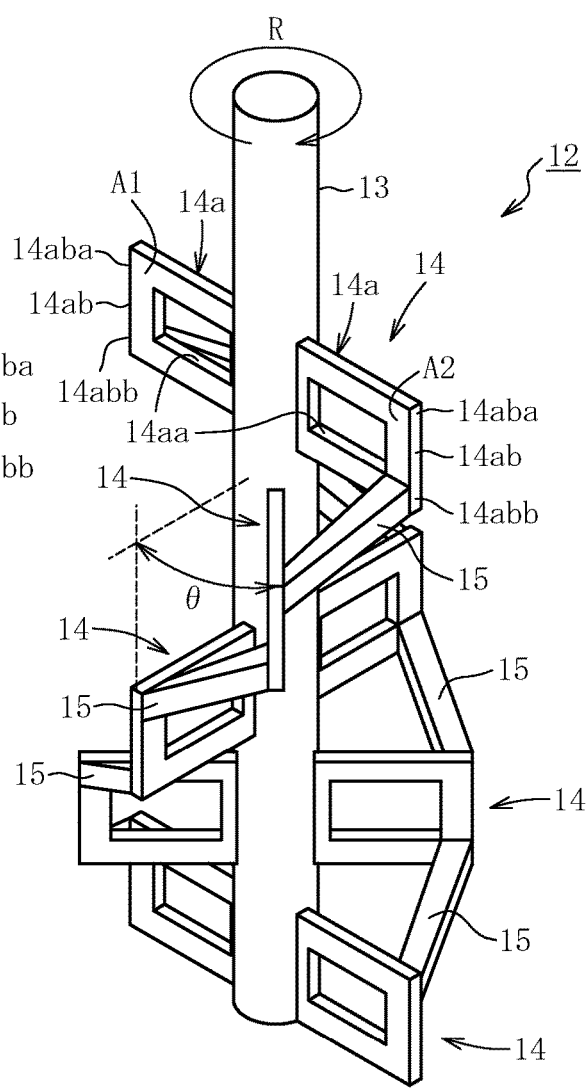

STIRRER AND METHOD FOR MANUFACTURING GLASS PLATE

TECHNICAL FIELD

The present invention relates to a stirrer configured to stir molten glass in a stirring vessel, and a method of manufacturing a glass sheet through use of the stirrer.

BACKGROUND ART

As is well known, in a manufacturing process of a glass sheet, a stirring step is performed. The stirring step involves stirring molten glass serving as an origin of the glass sheet to homogenize the molten glass in a stirring vessel formed in a cylindrical shape. When the stirring step is performed, a stirrer is used, which includes a shaft and a stirring blade that turns about the shaft in association with rotation of the shaft. The molten glass is stirred with the stirrer while flowing through the stirring vessel along a longitudinal direction of the shaft.

Here, in each of Patent Literature 1 and Patent Literature 2, there is disclosed one example of a specific configuration of a stirrer. In Patent Literature 1, there is disclosed a stirrer (hereinafter referred to as "first stirrer"), which includes a shaft and a plurality of stirring blades arranged at intervals along the shaft, each of the stirring blades being formed in a paddle shape. In addition, in Patent Literature 2, there is disclosed a stirrer (hereinafter referred to as "second stirrer"), which includes a shaft and a stirring blade formed in a helical shape around the shaft, the stirring blade having through openings that penetrate therethrough.

In the second stirrer, in addition to an original flow (flow directed from an upper side to a lower side in Patent Literature 2) of molten glass in a stirring vessel, a flow (flow directed from the lower side to the upper side, which is called a spiral flow, in Patent Literature 2) of the molten glass formed by the stirring blade, which has a direction opposite to that of the original flow, is formed, to thereby circulate the molten glass in the stirring vessel to accelerate stirring. In addition, the molten glass is caused to pass through the through openings, to thereby cause a shear force (shear force that acts on the molten glass along a turning direction of the stirring blade, and hereinafter, the "shear force" means a shear force that acts on the molten glass along the turning direction of the stirring blade) to act on the molten glass.

CITATION LIST

Patent Literature 1: JP 2011-178656 A
Patent Literature 2: JP 2008-120630 A

SUMMARY OF INVENTION

Technical Problem

However, in any of the above-mentioned first and second stirrers, there is a problem in that the stirring performance of the molten glass is not sufficient as described below.

More specifically, in the first stirrer, the molten glass and the stirring blades turn in the same direction in the stirring vessel, which makes it difficult to cause a shear force to act on the molten glass from the stirring blades. Therefore, it is difficult to sufficiently stir the molten glass. Meanwhile, in the second stirrer, a shear force that may act on the molten glass from the stirring blade is significantly small in the vicinity of an inner peripheral wall of the stirring vessel, and hence it is impossible to sufficiently stir the molten glass in the vicinity of the inner peripheral wall.

The present invention has been made in view of the above-mentioned circumstances, and a technical object of the present invention is to improve a stirrer to enhance the stirring performance of the molten glass.

Solution to Problem

According to one embodiment of the present invention, which has been devised to achieve the above-mentioned object, there is provided a stirrer, comprising: a shaft; and a plurality of stirring blades mounted on the shaft along a longitudinal direction of the shaft, the stirrer being configured to stir molten glass in a stirring vessel by causing the plurality of stirring blades to turn about the shaft in association with rotation of the shaft, wherein the plurality of stirring blades each have a through opening, wherein the plurality of stirring blades each have a distal end portion extending along the longitudinal direction of the shaft, and wherein the plurality of stirring blades are mounted on the shaft so that, when the plurality of stirring blades turn about the shaft, the stirring blades that are closer to one end side of the shaft are delayed in phase around the shaft with respect to the stirring blades on another end side of the shaft.

When the stirrer according to the embodiment of the present invention is used in the stirring vessel in which the molten glass flows from the one end side to the another end side of the shaft, the following effect is obtained. Specifically, the stirring blades each have the through opening, and hence the molten glass can pass through the through opening of the turning stirring blade, and the situation in which the molten glass and the stirring blade turn in the same direction in the stirring vessel can be avoided. In addition, a shear force can also be caused to act on the molten glass in association with the passage of the molten glass through the through opening. In addition, the stirring blades each have the distal end portion extending along the longitudinal direction of the shaft, and hence the shear force can be caused to suitably act on the molten glass from the stirring blade in the vicinity of an inner peripheral wall of the stirring vessel. Further, in the stirrer, the plurality of stirring blades are mounted on the shaft so that, when the stirring blades turn about the shaft, the stirring blades that are closer to the one end side of the shaft are delayed in phase around the shaft with respect to the stirring blades on the another end side of the shaft. With this, in association with turning of the stirring blades about the shaft, a flow of the molten glass directed from the another end side to the one end side can be formed in the vicinity of the shaft. When the above-mentioned flow is combined with an original flow of the molten glass directed from the one end side to the another end side of the shaft in the stirring vessel and a turning flow in a circumferential direction generated by turning of the stirring blades, a flow along a radial direction of the shaft is generated. Due to the flow along the radial direction, the molten glass in the vicinity of the shaft and the molten glass on a side of the inner peripheral wall are replaced by one another. Therefore, through use of the stirrer according to the embodiment of the present invention, the opportunity in which the molten glass undergoes the shear force is increased, and hence stirring of the molten glass can be accelerated. As described above, with the stirrer according to the embodiment of the present invention, the stirring performance of the molten glass can be enhanced.

With the stirrer according to the embodiment of the present invention, the following effect can be additionally obtained. Specifically, the stirring blades each have the through opening, and hence the resistance which the stirring blade receives from the molten glass when turning about the shaft can be suppressed. Therefore, the strength of the stirring blade required for preventing breakage and deformation of the stirring blade can be decreased, and along with this, the stirring blade can be reduced in weight. As a result, a torque required for rotating the shaft (causing the stirring blade to turn) can be reduced. In addition, in the stirrer, the stirring performance of the molten glass is enhanced, and hence the molten glass can be sufficiently stirred even when the number of rotations of the shaft is decreased. With this, through decrease in number of rotations, it is possible to reduce the risk in that platinum or a platinum alloy is peeled from a surface of the stirring blade made of the platinum or the platinum alloy.

In the configuration described above, it is preferred that the through opening be configured to penetrate through the stirring blade along a turning direction of the stirring blade.

With the foregoing, the molten glass can pass through the through opening more easily, and hence the resistance which the stirring blade receives from the molten glass can be further suppressed. Thus, the strength required in the stirring blade can be further decreased, and the stirring blade can be further reduced in weight, with the result that a torque required for rotating the shaft can be further reduced.

In the configuration described above, it is preferred that the plurality of stirring blades each comprise a pair of blade bodies arranged symmetrically with respect to the shaft, and each of the pair of blade bodies comprise the through opening and the distal end portion.

With the foregoing, the pair of blade bodies are arranged symmetrically with respect to the shaft, and hence the center of gravity of the entire stirrer can be positioned on the shaft. With this, it is possible to appropriately eliminate the risk in that a defect, for example, decentering caused in the rotating shaft may occur, and the distal end portion of the stirring blade and the inner peripheral wall of the stirring vessel collide with each other.

Further, according to one embodiment of the present invention, which has been devised to achieve the above-mentioned object, there is provided a stirrer, comprising a shaft and a plurality of stirring blades mounted on the shaft along a longitudinal direction of the shaft, the stirrer being configured to stir molten glass in a stirring vessel by causing the plurality of stirring blades to turn about the shaft in association with rotation of the shaft, wherein the plurality of stirring blades each have a distal end portion extending along the longitudinal direction of the shaft, wherein the plurality of stirring blades are mounted on the shaft so that, when the plurality of stirring blades turn about the shaft, the stirring blades that are closer to one end side of the shaft are delayed in phase around the shaft with respect to the stirring blades on another end side of the shaft, and wherein, among a plurality of groups of the stirring blades, each group including the adjacent stirring blades, an intermediate portion is interposed between the adjacent stirring blades in at least one of the groups of the stirring blades.

When the stirrer according to the embodiment of the present invention is used in the stirring vessel in which the molten glass flows from the one end side to the another end side of the shaft, the following effect is obtained. That is, in the stirrer, the plurality of stirring blades are mounted on the shaft so that, when the stirring blades turn about the shaft, the stirring blades that are closer to the one end side of the shaft are delayed in phase around the shaft with respect to the stirring blades on the another end side of the shaft. With this, in association with turning of the stirring blades about the shaft, a flow of the molten glass directed from the another end side to the one end side can be formed in the vicinity of the shaft. When the above-mentioned flow is combined with an original flow of the molten glass directed from the one end side to the another end side of the shaft in the stirring vessel and a turning flow in a circumferential direction generated by turning of the stirring blades, a flow along a radial direction of the shaft is generated. Due to the flow along the radial direction, the molten glass in the vicinity of the shaft and the molten glass on a side of the inner peripheral wall are replaced by one another. Therefore, through use of the stirrer according to the embodiment of the present invention, the opportunity in which the molten glass undergoes the shear force is increased, and hence stirring of the molten glass can be accelerated. In addition, in the stirrer, the stirring blades each have the distal end portion extending along the longitudinal direction of the shaft, and hence the shear force can be caused to suitably act on the molten glass from the stirring blade in the vicinity of an inner peripheral wall of the stirring vessel. With the foregoing, the molten glass in the vicinity of the inner peripheral wall can be effectively stirred while the molten glass is circulated in the stirring vessel. Further, in the stirrer, among the plurality of groups of the stirring blades, each group including the adjacent stirring blades, the intermediate portion is interposed between the adjacent stirring blades in at least one of the groups of the stirring blades. Therefore, due to the effect of the intermediate portion of stirring the molten glass, stirring of the molten glass can be further accelerated. As described above, with the stirrer according to the embodiment of the present invention, the stirring performance of the molten glass can be enhanced.

With the stirrer according to the embodiment of the present invention, the following effect can be additionally obtained. That is, in the stirrer, the stirring performance of the molten glass is enhanced, and hence the molten glass can be sufficiently stirred even when the number of rotations of the shaft is decreased. With this, through decrease in number of rotations, it is possible to reduce the risk in that platinum or a platinum alloy is peeled from a surface of the stirring blade made of the platinum or the platinum alloy.

In the configuration described above, it is preferred that the intermediate portion be interposed between the adjacent stirring blades in each of the plurality of groups of the stirring blades.

With the foregoing, the effect of the intermediate portion of stirring the molten glass can be further enhanced.

In the configuration described above, it is preferred that the intermediate portion is a coupling portion configured to couple the adjacent stirring blades to each other.

With the foregoing, through coupling of both the adjacent stirring blades by the coupling portion, the strength of the entire stirrer can be increased. With this, even when the number of rotations of the shaft provided to the stirrer is increased when the molten glass is stirred, breakage and deformation of the stirrer can be prevented by the increased strength.

In the configuration described above, it is preferred that the coupling portion be configured to couple the distal end portions of the adjacent stirring blades to each other.

With the foregoing, the shear force can be caused to act on the molten glass in the vicinity of the inner peripheral wall of the stirring vessel by the coupling portion, and hence the molten glass in the vicinity of the inner peripheral wall can be further effectively stirred.

In the configuration described above, it is preferred that the coupling portion be configured to couple one end of the distal end portion of the stirring blade that is relatively advanced in phase around the shaft to another end of the distal end portion of the stirring blade that is relatively delayed in phase around the shaft.

With the foregoing, the distal end portions of the stirring blades can be coupled to each other by the coupling portion that is short to the extent possible, and the molten glass that attempts to pass through the stirring blade without undergoing the shear force caused by the distal end portion of the stirring blade can be caused to undergo a shear force.

In the configuration described above, it is preferred that the distal end portion have a length along the longitudinal direction of the shaft, which is larger than a diameter of the shaft.

With the foregoing, it becomes more advantageous for causing the shear force to act on the molten glass in the vicinity of the inner peripheral wall of the stirring vessel.

In the configuration described above, it is preferred that the plurality of stirring blades each have a through opening.

With the foregoing, the molten glass can pass through the through opening of the turning stirring blade. Therefore, it is possible to appropriately eliminate the risk in that the molten glass and the stirring blade may turn in the same direction in the stirring vessel, and the shear force is less likely to act on the molten glass from the stirring blade. In addition, the shear force can also be caused to act on the molten glass in association with the passage of the molten glass through the through opening, and the effect of stirring the molten glass can be further enhanced. Moreover, the resistance which the stirring blade receives from the molten glass when turning about the shaft can be suppressed. Therefore, the strength of the stirring blade required for preventing breakage and deformation of the stirring blade can be decreased. Along with this, the stirring blade can be reduced in weight. As a result, a torque required for rotating the shaft (causing the stirring blade to turn) can be reduced.

In the configuration described above, it is preferred that the through opening be configured to penetrate through the stirring blade along a turning direction of the stirring blade.

With the foregoing, the molten glass can pass through the through opening more easily, and hence the resistance which the stirring blade receives from the molten glass can be further suppressed. Thus, the strength required in the stirring blade can be further decreased, and the stirring blade can be further reduced in weight, with the result that a torque required for rotating the shaft can be further reduced.

In the configuration described above, it is preferred that the plurality of stirring blades each comprise a pair of blade bodies arranged symmetrically with respect to the shaft, and each of the pair of blade bodies comprise the through opening and the distal end portion.

With the foregoing, the pair of blade bodies are arranged symmetrically with respect to the shaft, and hence the center of gravity of the entire stirrer can be positioned on the shaft. With this, it is possible to appropriately eliminate the risk in that a defect, for example, decentering caused in the rotating shaft may occur, and the distal end portion of the stirring blade and the inner peripheral wall of the stirring vessel collide with each other.

In addition, in a method of manufacturing a glass sheet involving manufacturing a glass sheet through use of the above-mentioned stirrer, a high-quality glass sheet, which can be used in, for example, a liquid crystal display substrate, can be easily obtained.

Advantageous Effects of Invention

With the stirrer according to the embodiment of the present invention, the stirring performance of the molten glass can be enhanced.

BRIEF DESCRIPTION OF DRAWINGS

FIG. 4a is a front view for illustrating a stirrer according to a second embodiment of the present invention.

FIG. 4b is a perspective view for illustrating the stirrer according to the second embodiment of the present invention.

FIG. 5a is a front view for illustrating a stirrer according to a third embodiment of the present invention.

FIG. 5b is a perspective view for illustrating the stirrer according to the third embodiment of the present invention.

FIG. 6a is a front view for illustrating a stirrer according to a fourth embodiment of the present invention.

FIG. 6b is a perspective view for illustrating the stirrer according to the fourth embodiment of the present invention.

FIG. 9a is a front view for illustrating a stirrer according to a sixth embodiment of the present invention.

FIG. 9b is a perspective view for illustrating the stirrer according to the sixth embodiment of the present invention.

DESCRIPTION OF EMBODIMENTS

Now, stirrers according to embodiments of the present invention are described with reference to the accompanying drawings. In each of the embodiments described below, description is given by exemplifying a stirrer used in a stirring vessel in which molten glass flows from an upper side to a lower side.

First Embodiment

A stirrer according to a first embodiment of the present invention is incorporated into a glass sheet manufacturing apparatus. First, description is given of an overview of the glass sheet manufacturing apparatus and a method of manufacturing a glass sheet through use of the manufacturing apparatus.

Figure 1:
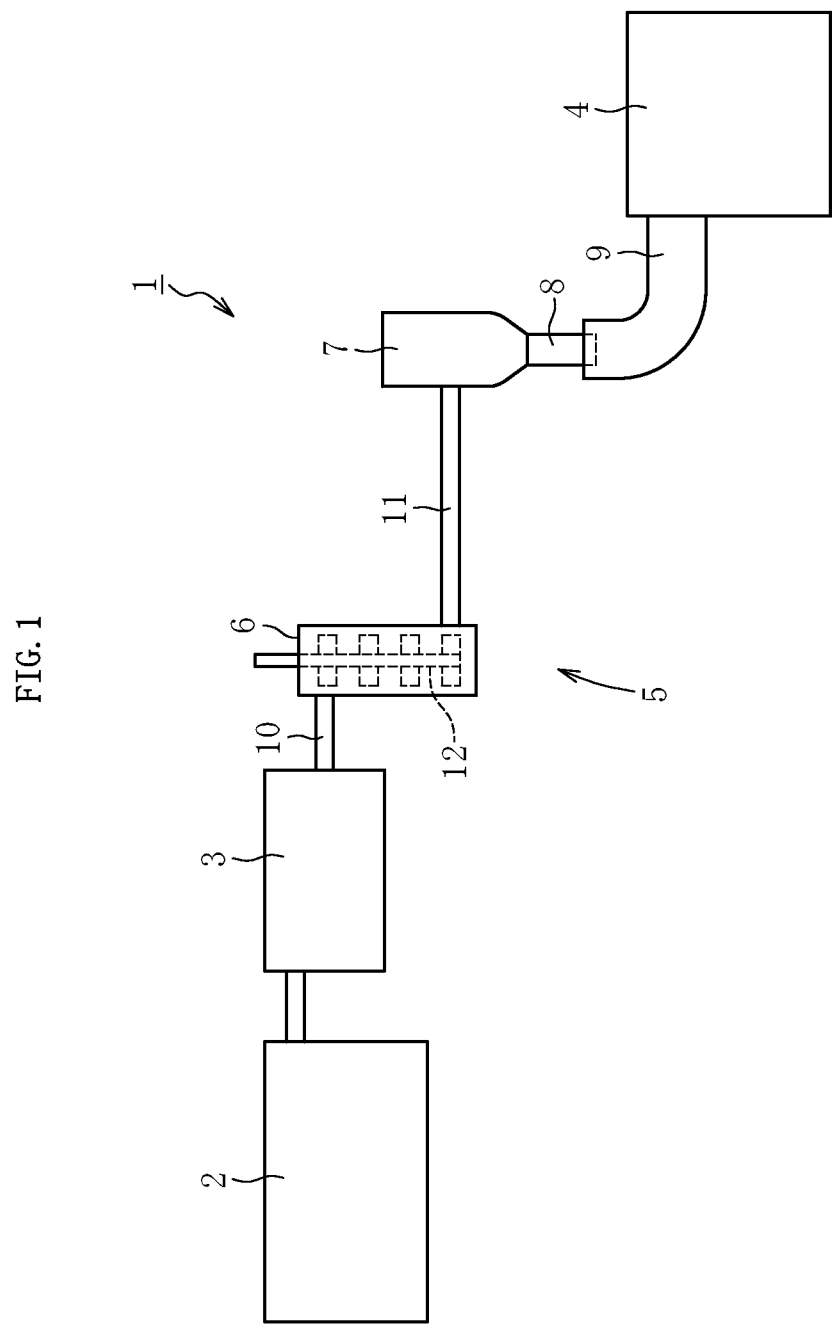
FIG. 1 is a view for schematically illustrating a glass sheet manufacturing apparatus in which a stirrer according to a first embodiment of the present invention is incorporated.

As illustrated in FIG. 1, a glass sheet manufacturing apparatus 1 comprises a supply path 5 configured to supply molten glass from a melting furnace 2 arranged on an upstream end and a fining chamber 3 connected to a downstream side of the melting furnace 2 to a forming device 4 arranged on a downstream end.

The supply path 5 comprises a stirring vessel 6 and a pot 7. The stirring vessel 6 is configured to stir the molten glass having flowed from the fining chamber 3. The pot 7 is connected to a downstream side of the stirring vessel 6, and is configured to mainly adjust the viscosity of the molten glass. There are further provided a small-diameter tube 8 and a large-diameter tube 9, which is coupled to the forming device 4, on a downstream side of the pot 7. The fining chamber 3 and the stirring vessel 6, and the stirring vessel 6 and the pot 7 are connected to each other, respectively, through a flow tube 10 and a flow tube 11 which are configured to cause the molten glass to flow therethrough. In the first embodiment, the single stirring vessel 6 is arranged, but a plurality of stirring vessels may be arranged.

The forming device 4 is a device configured to continuously form a glass sheet (glass ribbon) from the molten glass. As the forming device 4, there are given, for example, a forming device configured to perform an overflow downdraw method and a forming device configured to perform a slot down-draw method. Of those, it is preferred to adopt the forming device configured to perform an overflow downdraw method in which glass can be used with satisfactory surface quality without abrasion. The forming device 4 may also be a device configured form a glass product other than a glass sheet. As one example, the forming device 4 may be a device configured to continuously form a glass tube or a glass bar from the molten glass by a Danner method. In this case, in the glass sheet manufacturing apparatus 1, the configuration on the downstream side of the pot 7 is different from the illustrated configuration. However, the configuration in this case has already been known, and hence description thereof is omitted.

In manufacturing of a glass sheet through use of the manufacturing apparatus 1, first, a glass raw material is loaded into the melting furnace 2 to provide molten glass. Then, the molten glass is fined in the fining chamber 3, and the molten glass is stirred with a stirrer 12 described later in the stirring vessel 6. After that, the molten glass is supplied to the forming device 4 through the pot 7, the small-diameter tube 8, and the large-diameter tube 9, to thereby continuously form a glass sheet from the molten glass. Thus, the glass sheet is manufactured.

Next, the stirring vessel 6 provided to the supply path 5 and the stirrer 12 configured to stir the molten glass in the stirring vessel 6 are described in detail.

Figure 2:
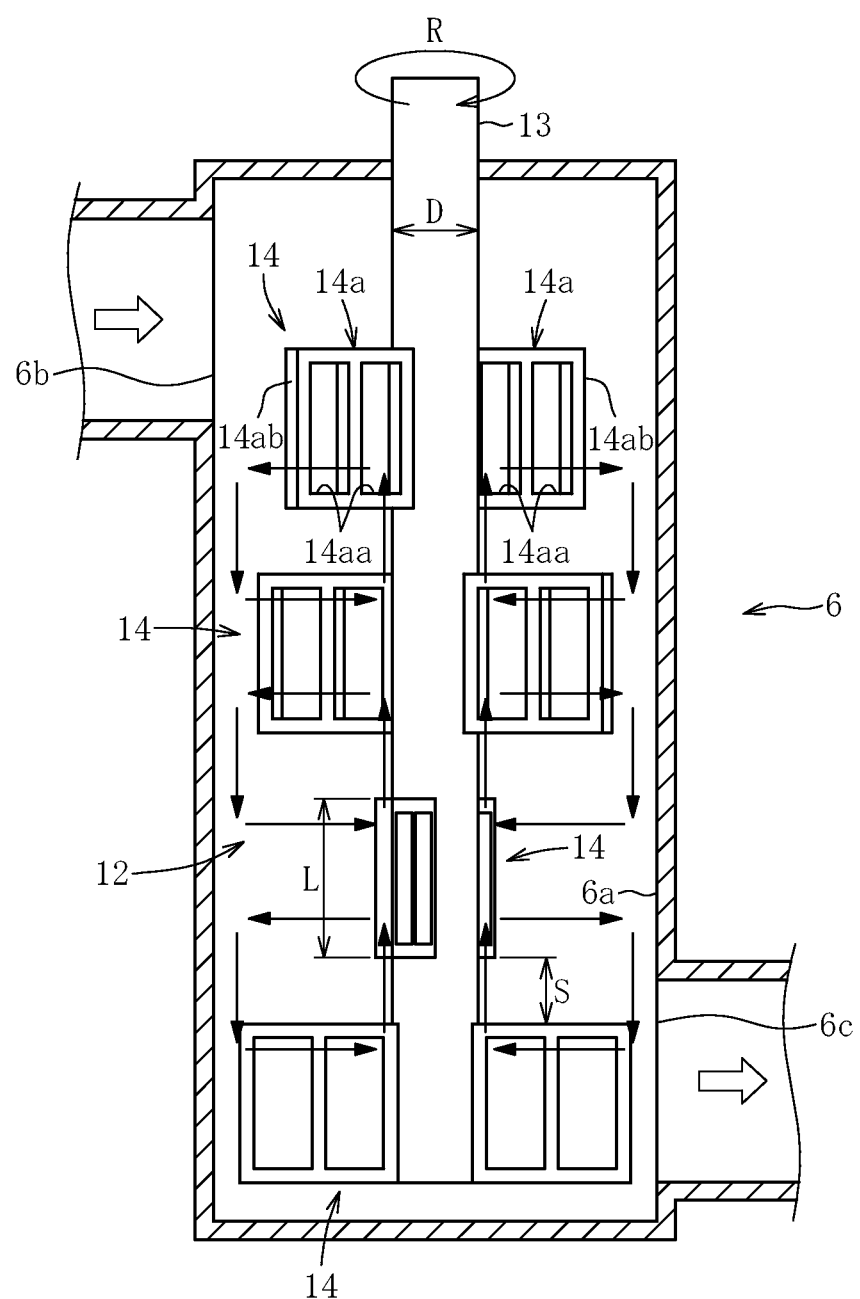
FIG. 2 is a sectional view for illustrating a stirring vessel in the glass sheet manufacturing apparatus.

As illustrated in FIG. 2, the stirring vessel 6 is formed in a cylindrical shape in which a cylinder center line extends in a vertical direction, and the surface of an inner peripheral wall 6a of the stirring vessel 6 is made of platinum or a platinum alloy. The stirrer 12 is arranged in the stirring vessel 6. In an upper portion of the stirring vessel 6, there is formed an inflow port 6b for causing the molten glass to flow into the stirring vessel 6 as indicated by the outlined arrow in FIG. 2. Meanwhile, in a lower portion of the stirring vessel 6, there is formed an outflow port 6c for causing the molten glass stirred with the stirrer 12 to flow out of the stirring vessel 6 as indicated by the outlined arrow in FIG. 2.

Figure 3:
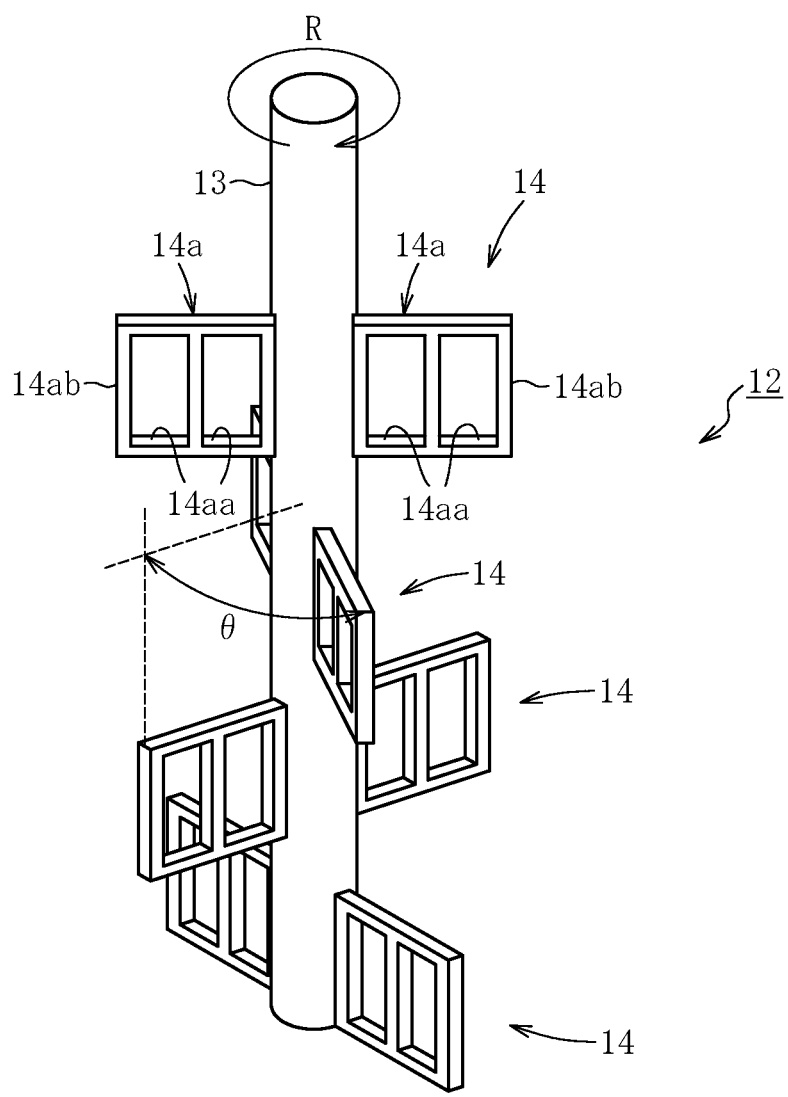
FIG. 3 is a perspective view for illustrating the stirrer according to the first embodiment of the present invention.

As illustrated in FIG. 2 and FIG. 3, the stirrer 12 comprises a shaft 13 and a plurality of stirring blades 14. The plurality of stirring blades 4 are mounted on the shaft 13 along a longitudinal direction (vertical direction) of the shaft 13. The surface of the shaft 13 and the surface of each of the stirring blades 14 are made of platinum or a platinum alloy. The stirrer 12 is configured to stir the molten glass in the stirring vessel 6 by causing the plurality of stirring blades 14 to turn about the shaft 13 in association with rotation of the shaft 13. In the first embodiment, four stirring blades 14 are mounted on the shaft 13, but the number of the stirring blades 14 may be appropriately increased or decreased.

The shaft 13 is formed as a round bar extending in the vertical direction, and an upper end portion thereof is connected to a drive source (for example, a motor) (not shown). In association with operation of the drive source, the shaft 13 is rotated in a direction indicated by the arrow R in FIG. 2 and FIG. 3. A lower end portion of the shaft 13 forms a free end unlike the upper end portion.

The plurality of stirring blades 14 are mounted on the shaft 13 at equal intervals along the longitudinal direction of the shaft 13. In addition, the plurality of stirring blades 14 are mounted on the shaft 13 so that, when the plurality of stirring blades 14 turn about the shaft 13, the stirring blades 14 that are closer to an upper end side of the shaft 13 are delayed in phase around the shaft 13 with respect to the stirring blades 14 on a lower end side. More specifically, of the stirring blades 14 and 14 adjacent to each other vertically, the stirring blade 14 that is arranged relatively on an upper side (i.e., toward an inflow port side) is delayed in phase around the shaft 13 by an angle θ with respect to the stirring blade 14 that is arranged relatively on a lower side (i.e., toward an outflow port side). The phase is delayed successively by the same angle θ from the stirring blade 14 in a lowermost stage, which is most advanced in phase, to the stirring blade 14 in an uppermost stage, which is most delayed in phase.

Due to the above-mentioned phase relationship, an upward flow of the molten glass directed from a lower side to an upper side is formed in the vicinity of the shaft 13 in association with turning of the plurality of stirring blades 13 about the shaft 13. Then, the upward flow is combined with a downward flow of the molten glass directed from the upper side to the lower side, which is an original flow in the stirring vessel 6, and a turning flow in a circumferential direction generated by turning of the stirring blades 14, with the result that a flow along a radial direction of the shaft 13 is generated. With this, the molten glass in the vicinity of the shaft 13 and the molten glass on a side of the inner peripheral wall 6a are replaced by one another as indicated by the solid arrows in FIG. 2.

In this case, in order to suitably form the upward flow of the molten glass, it is preferred that the value of the angle θ be set so as to fall within a range of from 10° to 80°. In the first embodiment, the value of the angle θ is set to 70°.

Each of the plurality of stirring blades 14 comprises a pair of blade bodies 14a arranged symmetrically with respect to the shaft 13 (axis symmetry with respect to a center axis line of the shaft 13). With this, in the stirrer 12 according to the first embodiment, the center of gravity of the entire stirrer 12 is positioned on the shaft 13. Each of the pair of blade bodies 14a has two through openings 14aa in a rectangular sheet-like body arranged in a vertical posture. The respective through openings 14*aa* are formed in the same rectangular shape, and the through openings 14*aa* penetrate through the blade body 14*a* along a turning direction of the blade body 14*a* (equivalent to a thickness direction of the blade body 14*a* in the first embodiment). A distal end portion 14*ab* of each of the blade bodies 14*a* extends along the longitudinal direction of the shaft 13. A length L of the distal end portion 14*ab* along the longitudinal direction of the shaft 13 is larger than a diameter D of the shaft 13. A gap is defined between the inner peripheral wall 6*a* of the stirring vessel 6 and the distal end portion 14*ab* of each of the blade bodies 14*a*.

Due to the forms of the distal end portion 14*ab* and the through opening 14*aa*, a shear force is caused to act on the molten glass from the distal end portion 14*ab* of each of the blade bodies 14*a* in the vicinity of the inner peripheral wall 6*a* of the stirring vessel 6 in association with turning of the plurality of stirring blades 14 about the shaft 13. In addition, through passage of the molten glass through the through opening 14*aa* of the turning blade body 14*a*, the shear force is caused to act on the molten glass in association with the passage of the molten glass through the through opening 14*aa* while the molten glass and the blade body 14*a* are prevented from turning in the same direction in the stirring vessel 6.

In this case, in order to facilitate the passage of the molten glass through the through opening 14*aa*, it is preferred that an aperture ratio of the through openings 14*aa* in each of the blade bodies 14*a* be set to 30% or more. Herein, the "aperture ratio" means a ratio of an opening area of the through openings 14*aa* with respect to an area of the rectangular sheet-like body (sheet-like body in a state in which the through openings 14*aa* are not formed) serving as an origin of the blade body 14*a*. In addition, in order to suitably cause the shear force to act on the molten glass from the distal end portion 14*ab* of the blade body 14*a*, it is preferred that the length L of the distal end portion 14*ab* be set to from 50% to 150% based on an interval S between the stirring blades 14 and 14 adjacent to each other vertically along the longitudinal direction of the shaft 13.

Next, the main action and effect of the stirrer 12 according to the first embodiment are described.

In the stirrer 12, the shear force can be caused to act on the molten glass passing through the through opening 14*aa* formed in the stirring blade 14 (blade body 14*a*) while the molten glass and the stirring blade 14 (blade body 14*a*) are prevented from turning in the same direction in the stirring vessel 6. Further, the shear force can be caused to suitably act on the molten glass from the distal end portion 14*ab* of the stirring blade 14 (blade body 14*a*) in the vicinity of the inner peripheral wall 6*a* of the stirring vessel 6. In addition, through formation of the flow of the molten glass, which causes the molten glass in the vicinity of the shaft 13 and the molten glass on a side of the inner peripheral wall 6*a* to be replaced by one another, stirring of the molten glass can be further accelerated. As a result, the stirring performance of the molten glass can be enhanced.

Now, stirrers according to other embodiments of the present invention are described with reference to the accompanying drawings. In description of the other embodiments, the elements described in the first embodiment are denoted by the same reference symbols as those in the first embodiment in the description of the other embodiments or the drawings with which description of the other embodiments are made, and overlapping description is omitted.

Second Embodiment to Fourth Embodiment

FIG. 4*a* to FIG. 6*b* are views for illustrating the stirrer 12 according to each of a second embodiment to a fourth embodiment of the present invention. The stirrer 12 according to each of those embodiments is different from the stirrer 12 according to the first embodiment in the following three points: (1) the number of stirring blades 14; (2) the number and shape of the through openings 14*aa* formed in the blade body 14*a*; and (3) the value of the angle θ.

As illustrated in FIG. 4*a* and FIG. 4*b*, in the stirrer 12 according to the second embodiment, the number of stirring blades 14 is set to three. In addition, the number of the through openings 14*aa* formed in one blade body 14*a* is set to four. The four through openings 14*aa* are formed in the same shape. Further, the value of the angle θ is set to 45°. As illustrated in FIG. 5*a* and FIG. 5*b*, in the stirrer 12 according to the third embodiment, the number of the stirring blades 14 is set to five. In addition, the single through opening 14*aa* is formed in one blade body 14*a*. Further, the value of the angle θ is set to 45°. As illustrated in FIG. 6*a* and FIG. 6*b*, in the stirrer 12 according to the fourth embodiment, the number of the stirring blades 14 is set to five. In addition, the single through opening 14*aa* is formed in one blade body 14*a*, and the through opening 14*aa* is formed in an oval shape instead of the rectangular shape. Further, the value of the angle θ is set to 45°.

Fifth Embodiment

Figure 7:
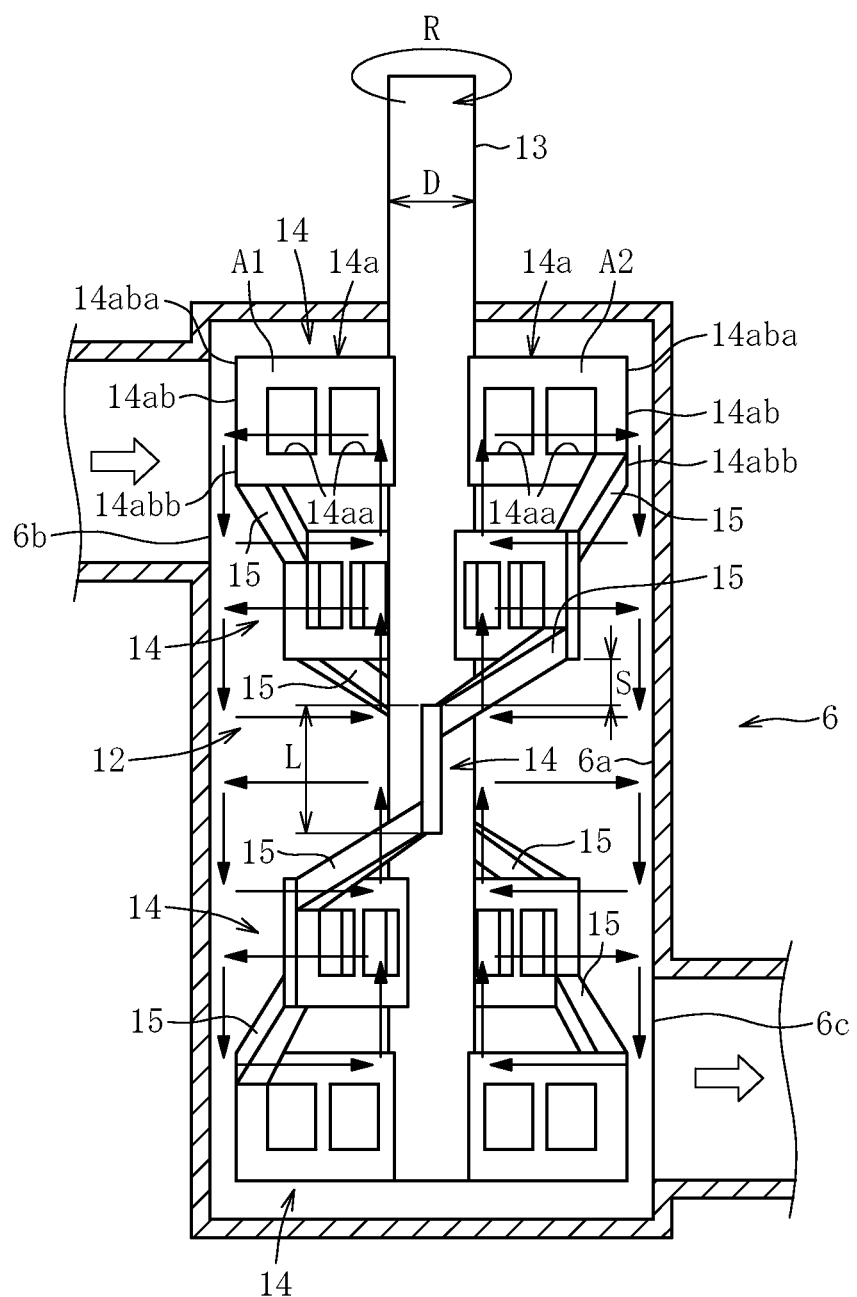
FIG. 7 is a sectional view for illustrating the stirring vessel in the glass sheet manufacturing apparatus.
Figure 8:
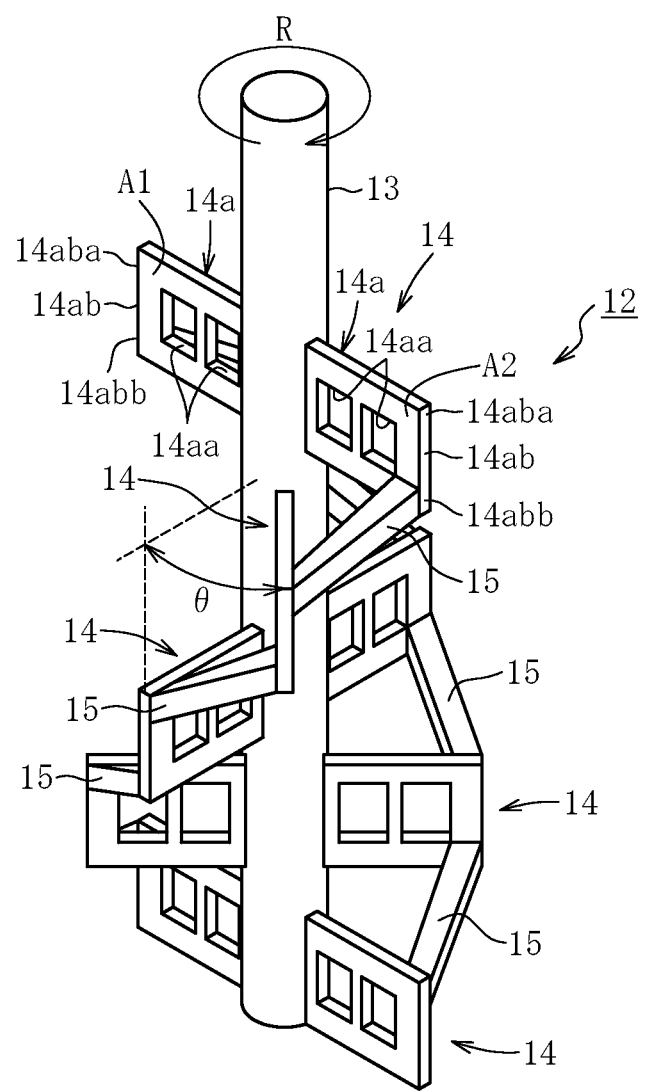
FIG. 8 is a perspective view for illustrating a stirrer according to a fifth embodiment of the present invention.

As illustrated in FIG. 7 and FIG. 8, the stirrer 12 according to a fifth embodiment of the present invention is different from the stirrer 12 according to the first embodiment in the following three points: (1) the distal end portions 14*ab* of the blade bodies 14*a* in both the stirring blades 14 and 14 adjacent to each other vertically are coupled to each other by a coupling portion 15 (intermediate portion) interposed between the distal end portions 14*ab*; (2) the number of the stirring blades 14 is set to five; and (3) the value of the angle θ is set to 45°.

The coupling portion 15 is formed as a square bar extending in a straight line, and extends so as to connect a back surface A1 of the blade body 14*a* arranged relatively on the lower side (side on which the phase is advanced) and a front surface A2 of the blade body 14*a* arranged relatively on the upper side (side on which the phase is delayed). In addition, the coupling portion 15 is configured to couple an upper end 14*aba* of the distal end portion 14*ab* in the blade body 14*a* arranged relatively on the lower side and a lower end 14*abb* of the distal end portion 14*ab* in the blade body 14*a* arranged relatively on the upper side to each other.

The coupling portion 15 is provided to each of one side and another side of the pair of blade bodies 14*a*. The coupling portion 15 on one side and the coupling portion 15 on another side are arranged symmetrically with respect to the shaft 13 (axis symmetry with respect to the center axis line of the shaft 13 when viewed from a direction along the longitudinal direction of the shaft 13). In addition to the above-mentioned arrangement of the coupling portions 15, the pair of blade bodies 14*a* are arranged symmetrically with respect to the shaft 13 as described above. Therefore, in the stirrer 12 according to the fifth embodiment, the center of gravity of the entire stirrer 12 can be positioned on the shaft 13.

Due to the above-mentioned form of the coupling portions 15, the coupling portions 15 stir the molten glass in association with turning of the plurality of stirring blades 14 about the shaft 13.

In this case, in addition to the coupling portions 15 configured to couple the distal end portions 14*ab* of the blade bodies 14*a* to each other, the coupling portions 15 configured to couple portions other than the distal end portions 14*ab* to each other may be separately provided. In addition, only the coupling portions 15 configured to couple the portions other than the distal end portions 14*ab* to each other may be provided without providing the coupling portions 15 configured to couple the distal end portions 14*ab* to each other. Further, the coupling portion 15 may be formed as a round bar instead of the square bar.

In addition, it is preferred that the distal end portions 14*ab* of the blade bodies 14*a* be coupled to each other from the viewpoint of the strength of the stirrer 12. However, the present invention is not limited thereto, and it is not always required that the distal end portions 14*ab* be coupled to each other. For example, a member (intermediate portion), which is merely interposed between the distal end portions 14*ab* without coupling the distal end portions 14*ab* to each other, may be provided in place of the coupling portion 15. As one example, the coupling portion 15 in the fifth embodiment may be disconnected at an intermediate point thereof to define a gap between parts obtained after the disconnection.

Next, the main action and effect of the stirrer 12 according to the fifth embodiment are described.

In the stirrer 12, the molten glass in the vicinity of the inner peripheral wall 6*a* of the stirring vessel 6 can be effectively stirred with the distal end portions 14*ab* of the stirring blades 14 (blade bodies 14*a*). In addition, the effect of the coupling portion 15 of stirring the molten glass is obtained, and hence stirring of the molten glass can be further accelerated. As a result, the stirring performance of the molten glass can be enhanced.

Now, stirrers according to other embodiments of the present invention are described with reference to the accompanying drawings. In description of the other embodiments, the elements described in the first embodiment are denoted by the same reference symbols as those in the fifth embodiment in the description of the other embodiments or the drawings with which description of the other embodiments are made, and overlapping description is omitted.

Sixth Embodiment to Eighth Embodiment

FIG. 9*a* to FIG. 11*b* are views for illustrating the stirrer 12 according to each of a sixth embodiment to an eighth embodiment of the present invention. The stirrer 12 according to each of those embodiments is different from the stirrer 12 according to the fifth embodiment in the number and shape of the through openings 14*aa* formed in the blade body 14*a*.

Figure 10A:
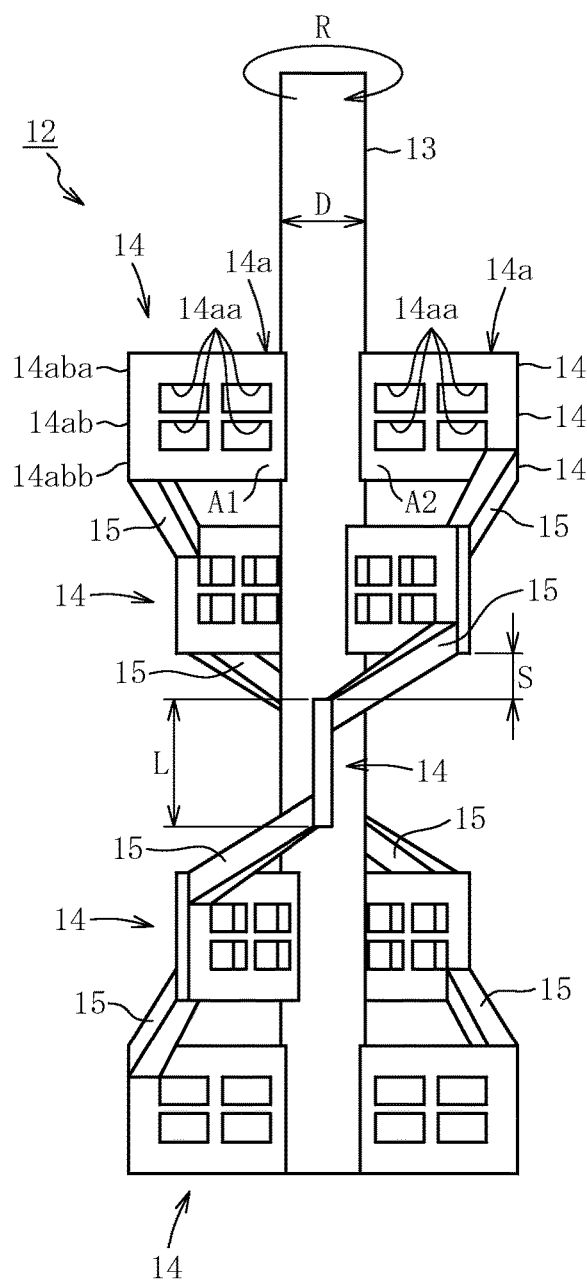
FIG. 10a is a front view for illustrating a stirrer according to a seventh embodiment of the present invention.
Figure 10B:
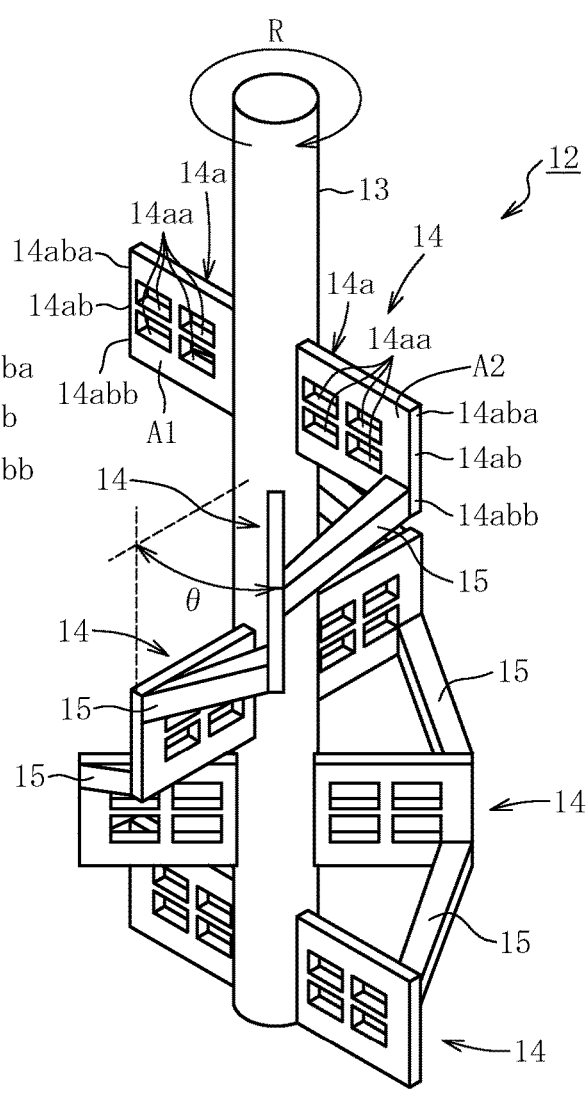
FIG. 10b is a perspective view for illustrating the stirrer according to the seventh embodiment of the present invention.
Figure 11A:
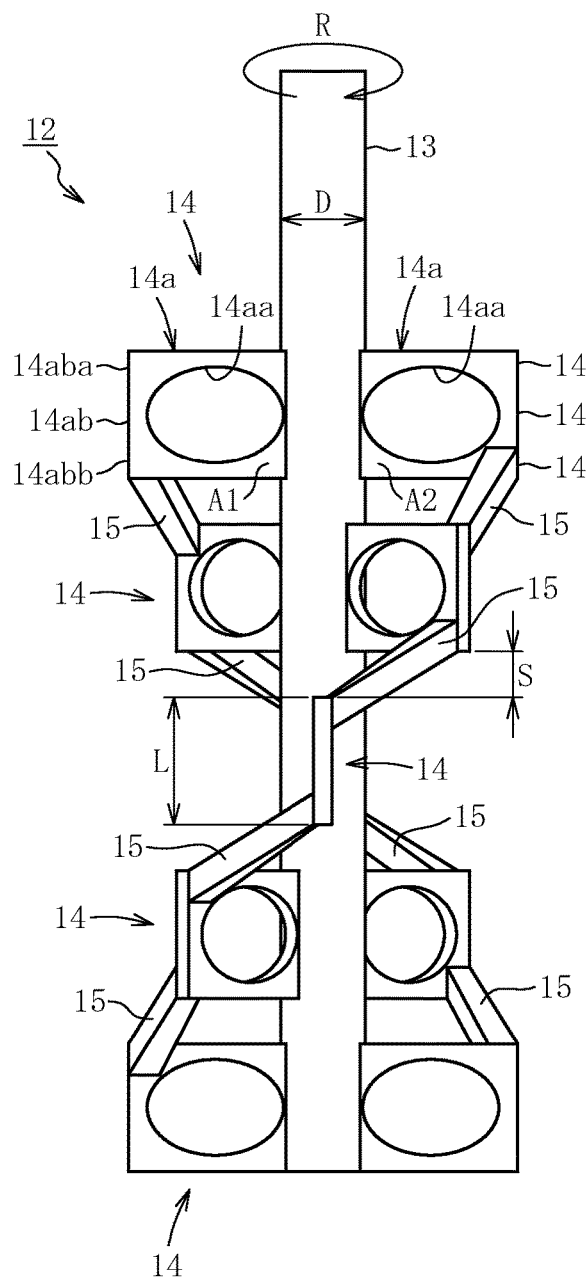
FIG. 11a is a front view for illustrating a stirrer according to an eighth embodiment of the present invention.
Figure 11B:
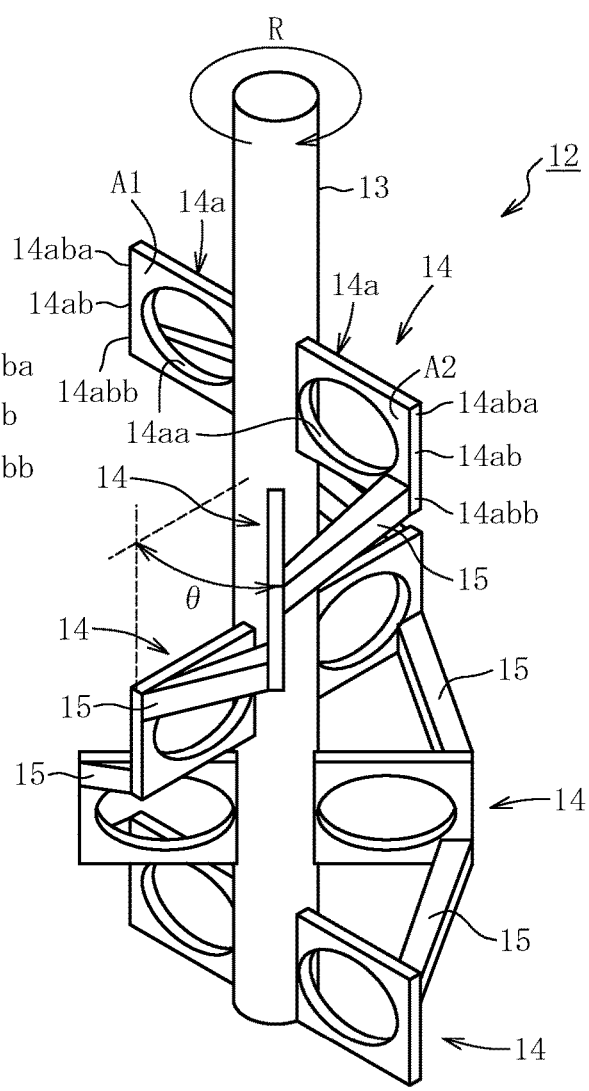
FIG. 11b is a perspective view for illustrating the stirrer according to the eighth embodiment of the present invention.

As illustrated in FIG. 9*a* and FIG. 9*b*, in the stirrer 12 according to the sixth embodiment, the single through opening 14*aa* is formed in one blade body 14*a*. As illustrated in FIG. 10*a* and FIG. 10*b*, in the stirrer 12 according to the seventh embodiment, the number of the through openings 14*aa* formed in one blade body 14*a* is set to four. The four through openings 14*aa* are formed in the same shape. As illustrated in FIG. 11*a* and FIG. 11*b*, in the stirrer 12 according to the eighth embodiment, the single through opening 14*aa* is formed in one blade body 14*a*, and the through opening 14*aa* is formed in an oval shape instead of the rectangular shape.

Ninth Embodiment

Figure 12A:
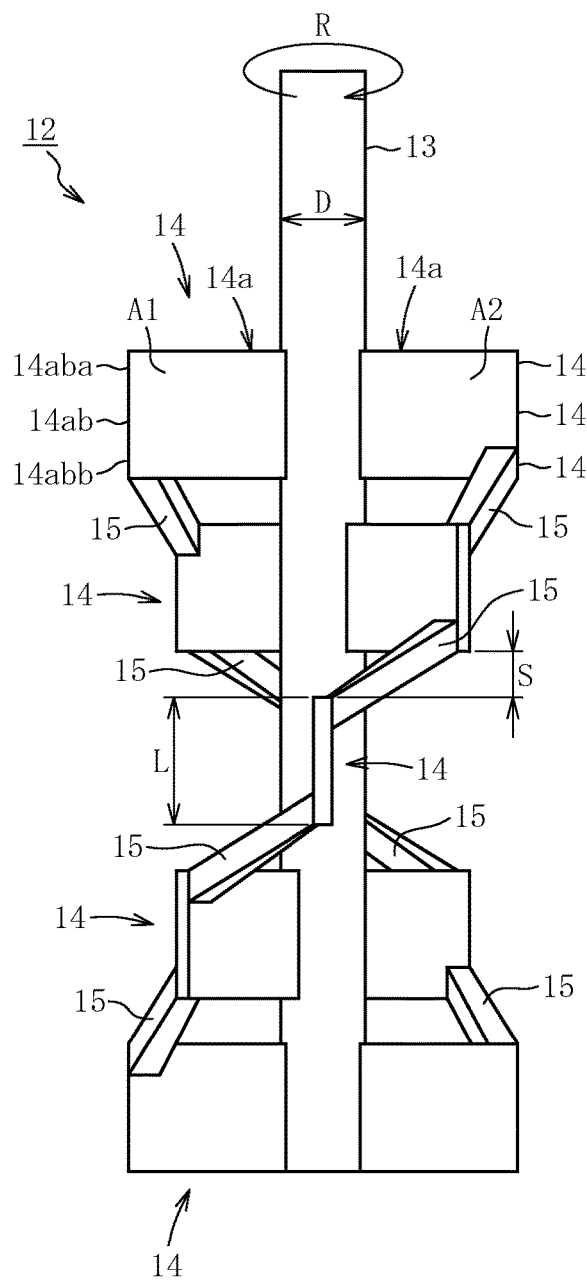
FIG. 12a is a front view for illustrating a stirrer according to a ninth embodiment of the present invention.
Figure 12B:
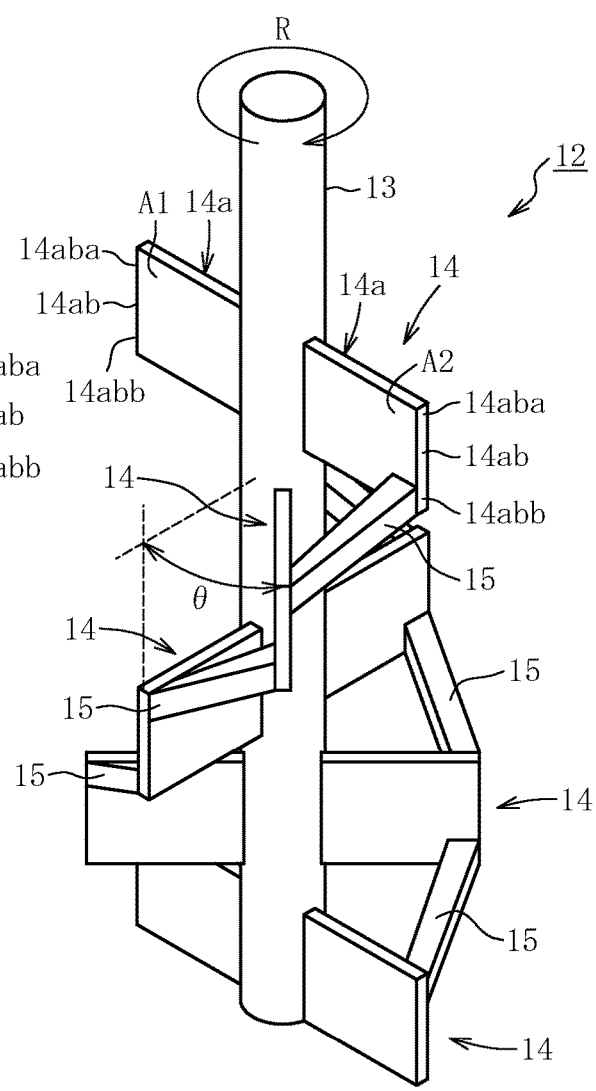
FIG. 12b is a perspective view for illustrating the stirrer according to the ninth embodiment of the present invention.

FIG. 12*a* and FIG. 12*b* are views for illustrating the stirrer 12 according to a ninth embodiment of the present invention. The stirrer 12 according to the ninth embodiment is different from stirrer 12 according to the fifth embodiment in that the through opening 14*aa* is not formed in the blade body 14*a*, and the blade body 14*a* is merely formed of a rectangular sheet-like body.

Tenth Embodiment

Figure 13A:
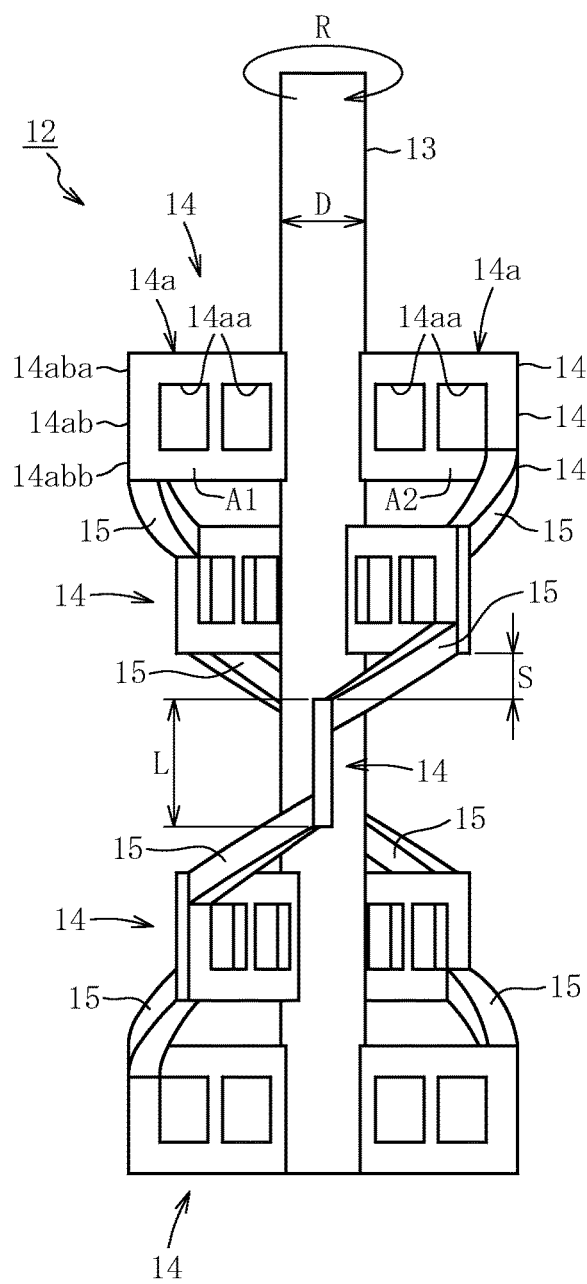
FIG. 13a is a front view for illustrating a stirrer according to a tenth embodiment of the present invention.
Figure 13B:
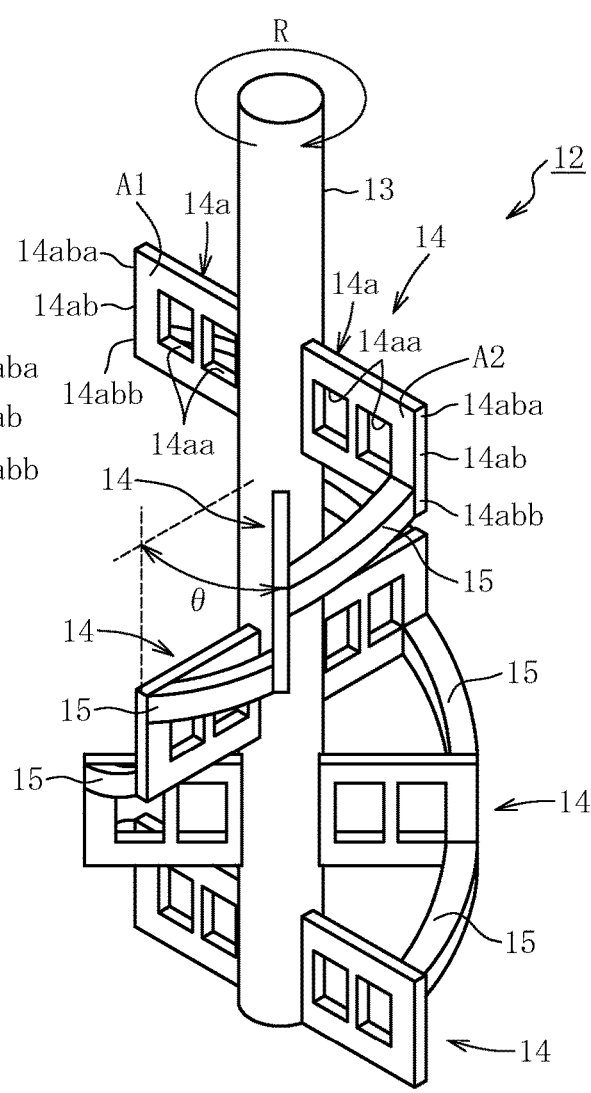
FIG. 13b is a perspective view for illustrating the stirrer according to the tenth embodiment of the present invention.

FIG. 13*a* and FIG. 13*b* are views for illustrating the stirrer 12 according to a tenth embodiment of the present invention. The stirrer 12 according to the tenth embodiment is different from the stirrer 12 according to the fifth embodiment in that the shape of the coupling portion 15 configured to couple the distal end portions 14*ab* of the blade bodies 14*a* is different. In the stirrer 12 according to the tenth embodiment, the coupling portion 15 is formed so as to be curved, and the coupling portion 15 is formed in an arc shape, with the shaft 13 being the center, when viewed from the direction along the longitudinal direction of the shaft 13.

In this case, the stirrer of the present invention is not limited to the configuration described in each of the above-mentioned embodiments. For example, the stirrer according to each of the above-mentioned embodiments is designed to be used in the stirring vessel in which the molten glass flows from the upper side to the lower side. However, the stirrer of the present invention can be applied also to the stirring vessel in which the molten glass flows from the lower side to the upper side. In this case, the plurality of stirring blades are mounted on the shaft so that, when the plurality of stirring blades turn about the shaft, the stirring blades that are closer to the lower end side of the shaft are delayed in phase around the shaft with respect to the stirring blades on the upper end side of the shaft.

In addition, in the stirrer according to each of the above-mentioned embodiments, the blade body is arranged on each of one side and another side of each of the stirring blades. However, the present invention is not limited thereto, and the blade body may be arranged only on one side. Meanwhile, each of the stirring blades may comprise three or more blade bodies. In this case, it is preferred that the plurality of blade bodies be arranged evenly around the shaft. For example, when each of the stirring blades comprises three blade bodies, it is preferred that the blade bodies be arranged at intervals of 120° around the shaft.

In addition, in the stirrers according to all the embodiments except for the stirrer according to the ninth embodiment, the blade body provided to the stirring blade has the through opening in a rectangular sheet-like body arranged in a vertical posture. However, the present invention is not limited thereto. For example, in the stirrers according to the first to third embodiments, the fifth to seventh embodiments, and the tenth embodiment, bar members, for example, a plurality of square bars or a plurality of round bars are coupled to each other in vertical and horizontal directions to manufacture a rectangular frame body, and the frame body may be adopted as a blade body.

In addition, in the stirrers according to all the embodiments except for the stirrer according to the ninth embodiment, all the stirring blades (blade bodies) have the same number of through openings having the same shape. However, the number and shape of the through openings of at least one stirring blade may be different from those of the other stirring blades.

In addition, a stirrer in which the rotation (turning) direction in the stirring vessel is opposite may be adopted in place of the stirrer according to each of the above-mentioned embodiments. Even when such stirrer is adopted, it is required that the stirring blade arranged relatively on the upper side be delayed in phase around the shaft with respect to the stirring blade arranged relatively on the lower side. For this purpose, the arrangement of each of the stirring blades (each of the blade bodies) is modified from the arrangement in each of the above-mentioned embodiments so that the delay in phase occurs in an opposite direction with respect to each of the embodiments.

In addition, in the stirrer according to each of the above-mentioned embodiments, the phase is delayed successively by the same amount from the stirring blade that is most advanced in phase to the stirring blade that is most delayed in phase in the plurality of stirring blades. However, the present invention is not limited thereto, and the amount of delay in phase may be varied.

REFERENCE SIGNS LIST 6 stirring vessel
12 stirrer
13 shaft
14 stirring blade
14a blade body
14aa through opening
14ab distal end portion
14aba upper end
14abb lower end
15 coupling portion (intermediate portion)
θ angle
D diameter
L length

The invention claimed is:

1. A stirring device comprising:
a stirring vessel formed in a cylindrical shape in which a cylinder center line extends in a vertical direction, the stirring vessel having an inflow port for molten glass formed at one end side thereof and an outflow port for the molten glass formed at another end side thereof; and
a stirrer arranged in the stirring vessel having a shaft extending in the vertical direction and a plurality of stirring blades made of a platinum or a platinum alloy mounted on the shaft along a longitudinal direction of the shaft,
wherein the stirring device is configured to stir the molten glass in the stirring vessel by causing the plurality of stirring blades to turn about the shaft in association with rotation of the shaft,
wherein the plurality of stirring blades each have a through opening,
wherein the plurality of stirring blades each have a distal end portion extending along the longitudinal direction of the shaft,
wherein the plurality of stirring blades are mounted on the shaft so that, when the plurality of stirring blades turn about the shaft, the stirring blades are successively delayed in phase around the shaft from an outflow port side of the stirring vessel towards an inflow port side of the stirring vessel, and
wherein an interval along the longitudinal direction of the shaft is provided between adjacent pairs of the stirring blades in the longitudinal direction of the shaft.

2. The stirring device according to claim 1, wherein each of the through openings is configured to penetrate through an associated one of the stirring blades along a turning direction of the associated one of the stirring blades.

3. A method of manufacturing a glass sheet from a molten glass, the method comprising:

stirring the molten glass with the stirring device of claim 2; and
forming the glass sheet from the molten glass after the stirring.

4. The stirring device according to claim 1,
wherein the plurality of stirring blades each comprise a pair of blade bodies arranged symmetrically with respect to the shaft, and
wherein each of the pair of blade bodies comprises the through opening and the distal end portion.

5. A method of manufacturing a glass sheet from a molten glass, the method comprising:
stirring the molten glass with the stirring device of claim 4; and
forming the glass sheet from the molten glass after the stirring.

6. A method of manufacturing a glass sheet from a molten glass, the method comprising:
stirring the molten glass with the stirring device of claim 1; and
forming the glass sheet from the molten glass after the stirring.

7. The stirring device according to claim 1, wherein each of the plurality of stirring blades has a pair of horizontal bars extending along a radial direction of the shaft, the pair of horizontal bars being spaced apart in the longitudinal direction of the shaft with the through opening between the pair of horizontal bars, and the pair of horizontal bars each being connected to the distal end portion.

8. A stirring device comprising:
a stirring vessel formed in a cylindrical shape in which a cylinder center line extends in a vertical direction, the stirring vessel having an inflow port for molten glass formed at one end side thereof and an outflow port for the molten glass formed at another end side thereof; and
a stirrer arranged in the stirring vessel having a shaft extending in the vertical direction and a plurality of stirring blades made of a platinum or a platinum alloy mounted on the shaft along a longitudinal direction of the shaft,
wherein the stirring device is configured to stir the molten glass in the stirring vessel by causing the plurality of stirring blades to turn about the shaft in association with rotation of the shaft,
wherein the plurality of stirring blades each have a distal end portion extending along the longitudinal direction of the shaft,
wherein the plurality of stirring blades are mounted on the shaft so that, when the plurality of stirring blades turn about the shaft, the stirring blades are successively delayed in phase around the shaft from an outflow port side of the stirring vessel towards an inflow port side of the stirring vessel,
wherein an interval along the longitudinal direction of the shaft is provided between adjacent pairs of the stirring blades in the longitudinal direction of the shaft, and
wherein, among a plurality of groups of the stirring blades, each group including adjacent stirring blades, an intermediate portion is interposed between the adjacent stirring blades in at least one of the groups of the stirring blades.

9. The stirring device according to claim 8, wherein the intermediate portion is interposed between the adjacent stirring blades in each of the plurality of groups of the stirring blades.

10. A method of manufacturing a glass sheet from a molten glass, the method comprising:
   stirring the molten glass with the stirring device of claim 9; and
   forming the glass sheet from the molten glass after the stirring.

11. The stirring device according to claim 8, wherein the intermediate portion is a coupling portion configured to couple the adjacent stirring blades to each other.

12. The stirring device according to claim 11, wherein the coupling portion is configured to couple the distal end portions of the adjacent stirring blades to each other.

13. The stirring device according to claim 12, wherein the coupling portion is configured to couple one end of the distal end portion of one of the adjacent stirring blades that is relatively advanced in phase around the shaft to another end of the distal end portion of another one of the adjacent stirring blades that is relatively delayed in phase around the shaft.

14. A method of manufacturing a glass sheet from a molten glass, the method comprising:
   stirring the molten glass with the stirring device of claim 11; and
   forming the glass sheet from the molten glass after the stirring.

15. A method of manufacturing a glass sheet from a molten glass, the method comprising:
   stirring the molten glass with the stirring device of claim 12; and
   forming the glass sheet from the molten glass after the stirring.

16. The stirring device according to claim 8, wherein the distal end portion of each of the plurality of stirring blades has a length along the longitudinal direction of the shaft, which is larger than a diameter of the shaft.

17. The stirring device according to claim 8,
   wherein the plurality of stirring blades each have a through opening, and
   wherein each of the through openings is configured to penetrate through an associated one of the stirring blades along a turning direction of the associated one of the stirring blades.

18. The stirring device according to claim 8,
   wherein the plurality of stirring blades each have a through opening,
   wherein the plurality of stirring blades each comprise a pair of blade bodies arranged symmetrically with respect to the shaft, and
   wherein each of the pair of blade bodies comprises the through opening and the distal end portion.

19. A method of manufacturing a glass sheet from a molten glass, the method comprising:
   stirring the molten glass with the stirring device of claim 8; and
   forming the glass sheet from the molten glass after the stirring.

20. The stirring device according to claim 8, wherein each of the plurality of stirring blades has a through opening and a pair of horizontal bars extending along a radial direction of the shaft, the pair of horizontal bars being spaced apart in the longitudinal direction of the shaft with the through opening between the pair of horizontal bars, and the pair of horizontal bars each being connected to the distal end portion.

* * * * *